G. LITTLE.
Improvement in Electrical Circuits for the Chemical Telegraph.
No. 123,711. Patented Feb. 13, 1872.
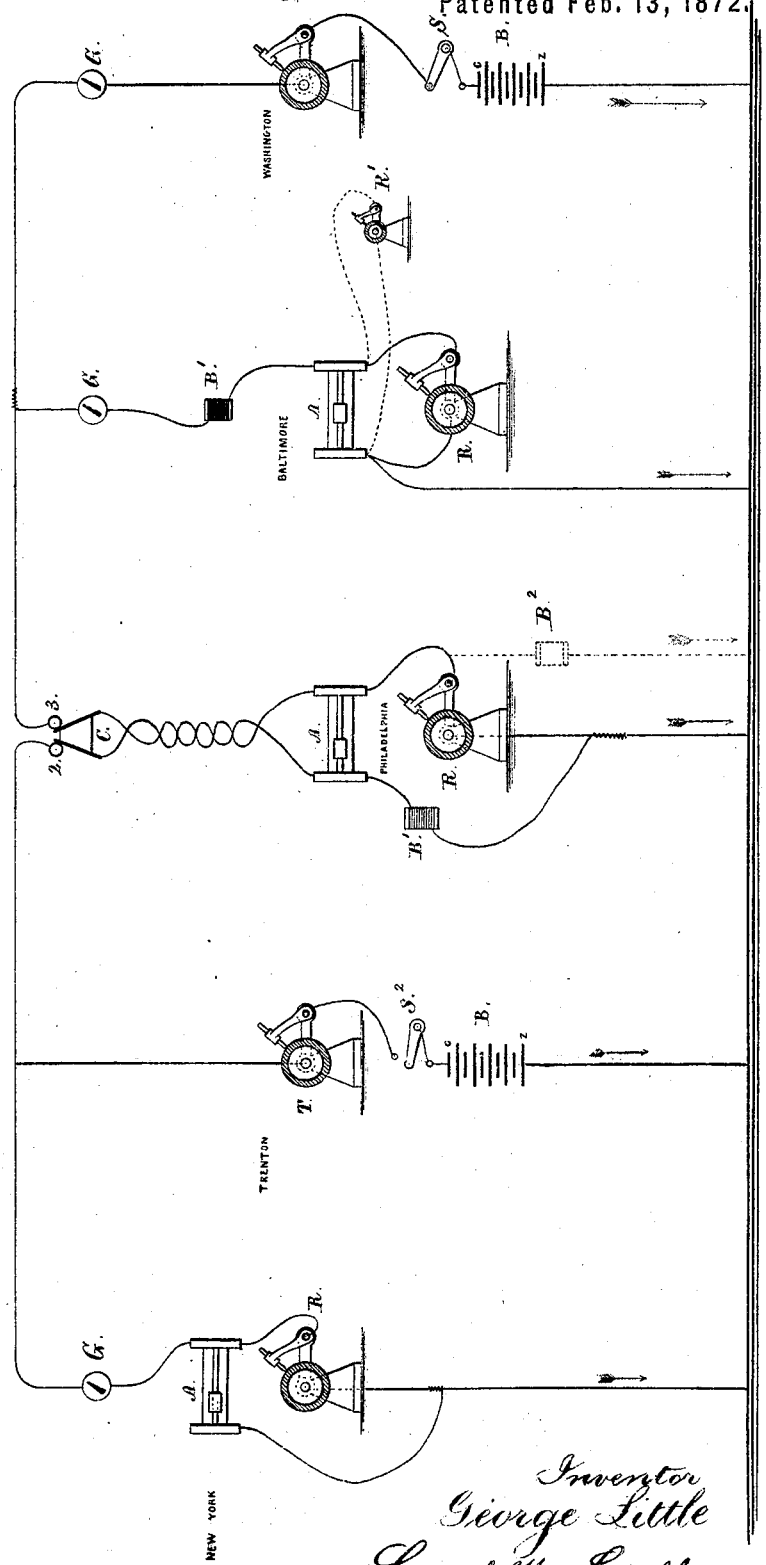
Witnesses
Chas. H. Smith
Geo. D. Walker
Inventor
George Little
Lemuel W. Serrell atty.

123,711

UNITED STATES PATENT OFFICE.

GEORGE LITTLE, OF RUTHERFORD PARK, NEW JERSEY.

IMPROVEMENT IN ELECTRICAL CIRCUITS FOR THE CHEMICAL TELEGRAPH.

Specification forming part of Letters Patent No. 123,711, dated February 13, 1872.

*To all whom it may concern:*

Be it known that I, GEORGE LITTLE, of Rutherford Park, in the county of Bergen and State of New Jersey, have invented an Improvement in Telegraph-Circuits; and the following is declared to be a correct specification of the same.

The special features of this invention relate to the arrangements of the circuits connected with chemical-telegraph apparatus in such a manner as to obtain two or more copies of a message at distant stations, and to regulate the force of the current in its action on the chemical paper, and thereby prevent the writing being blurred by too great force or not distinct from insufficiency of current.

In Letters Patent No. 4,532, reissued August 29, 1871, a branch circuit is connected from the main line to the earth, and a resistance and chemical telegraph placed in that circuit. In this case the entire branch current acts upon the paper, and if the battery at the sending station is powerful the branch circuit may be too powerful for taking a drop-copy, and not sufficiently to clear the line of surplus electricity.

I provide for this by placing a rheostat similar to that in my application for a patent dated August 23, 1870, in the branch circuit, and split the branch circuit, passing the proper portion through the receiving instrument, and allowing surplus to go to the earth.

In taking drop-copies at intermediate stations, there may be cases where a second drop-copy may be required in the same place, or near by, and this I accomplish by subdividing the branch circuit.

An intermediate station requires to be able to transmit either way on the line, or to receive from either way; this I effect by the use of a double wedge and flexible conductors, combined with the rheostat that regulates the action of the current in the receiving instrument, and at the same time I allow surplus electricity to leak to the earth.

The resistance is placed in the branch or earth circuit, to regulate the total amount of current passing in that branch or earth circuit, so that only the proper portion will be diverted from the main line.

When the instrument is employed in transmitting from an intermediate station, the current divides on the main line and goes each way to two or more stations, and the operator at those stations allows only the necessary portion of the current to pass through the chemical paper to make the record in his own instrument, the remainder of the current passing to the other instruments, and if the current is too powerful the surplus is allowed to pass to the earth.

To illustrate my invention I have shown in the drawing connections at five different stations, marked New York, Trenton, Philadelphia, Baltimore, Washington. It is to be understood that at each station the connections may be changed so as to effect what is effected at other stations, but to avoid complications only one character of connection is shown at any one station.

The batteries are marked B, and the positive pole $c$, and, at the negative, $z$. The instruments marked R are adapted to receiving the message, the electricity passing from a stylus to the chemical paper. The instruments marked T represent transmitters adapted to sending a message by a strip of perforated paper and a brush or roller. The rheostats A are made adjustable, and are substantially such as shown in my allowed application dated August 23, 1870.

The resistance $B^1$ is a tube of alcohol and glycerine and a movable wire, or any other device that can be varied to afford greater or less resistance to the passage of the current. The flexible conductor and wedge $c$, inserted either way between the poles 2 and 3 of the main line, serve to adapt the station to receiving or transmitting in either direction on the main line. The galvanometer G is to be of a delicate character, so as to indicate simply whether there is any change on the line, and in that way the receiving and transmitting operators both know whether the line is in work or not.

The illustration shows that at the Washington station the battery is connected by the switch S, and the transmitting instrument T is in operation. At Baltimore a branch circuit connects with the earth, the resistance $B^1$ determines the total quantity of the current, the rheostat A splits that current, and it is adjusted so that the proper proportion makes the mark in the chemical paper, and the remainder leaks away to earth. Thus the operator does not have to vary the resistance $B^1$, except in cases where he is taking too much or too little of the entire current transmitted. If desired to make a second or third copy at Baltimore of the message, the current is still further subdivided to the second instrument $R'$, the connections to the rheostat A being at the same points as the wires to the instrument R.

At the station marked Philadelphia, the rheostat A can be in the main line, and the flexible conductor C and wedge can be inserted so as to receive from either way on the line. The adjuster of the rheostat is positioned so as to cause the resistance necessary to split the current, passing a portion thereof through the receiving-paper, and thence to the earth; but if the current passing to the earth is so powerful as not to be easily controlled by the adjustment of the rheostat, a resistance at $B^1$ may be employed to lessen the current passing to the earth, and this resistance may be connected with the rheostat, as shown, so that there will be a leakage of surplus current to the earth, even when the receiving-stylus is thrown back. If the earth circuit is connected between the rheostat and receiving instrument, as shown by dotted lines, the receiving instrument will be in a shunt of the main line, and there will be a constant leakage of surplus electricity to the earth through a resistance, $B^2$.

At the station marked New York, the rheostat only serves to divert the proper current through the receiving instrument, the remainder leaking away to the earth.

At the station marked Trenton, a transmitting instrument is shown, and when the battery is connected with the same by the switch $S^2$ the current is sent to the main line and branches off, going both ways, and the operators at the receiving stations will adjust their rheostats so as to allow the necessary portion of the current to pass through the chemical paper, and in so doing there will be a resistance to the entire current passing through the nearest receiving instrument; therefore the current will be dammed back sufficient to cause it to reach one or more stations at a greater distance.

I claim as my invention—

1. The adjustable rheostat, applied in a circuit between the main line and the earth, in combination with a receiving telegraph instrument, to regulate the proportion of current passing to the said instrument, substantially as set forth.

2. A resistance to regulate the entire proportion of electricity passing over a branch circuit to the earth, in combination with an adjustable rheostat and receiving-telegraph instrument, substantially as set forth.

3. A wedge circuit-closer and flexible conductors, in combination with an adjustable rheostat and receiving-telegraph instrument, substantially as set forth.

4. A transmitting instrument connected to a main line, substantially as specified, so that the current is subdivided, passing in two opposite directions on the main line to two or more distant receiving stations.

5. Two circuits, each provided with a receiving-telegraph instrument connected to an adjustable rheostat, substantially as and for the purposes specified.

Signed by me this 12th day of December, A. D. 1871.

GEO. LITTLE.

Witnesses:
GEO. T. PINCKNEY,
CHAS. H. SMITH.